United States Patent
Souissi et al.

[19]

[11] Patent Number: 5,805,978
[45] Date of Patent: Sep. 8, 1998

[54] METHOD AND APPARATUS FOR OVERLAYING AN INBOUND CHANNEL ON AN OUTBOUND SYSTEM

[75] Inventors: Slim Souissi, Fort Worth; Casey Hill, Trophy Club; Jheroen P. Dorenbosch, Paradise, all of Tex.

[73] Assignee: Motorola, Inc., Schaumburg, Ill.

[21] Appl. No.: 732,567

[22] Filed: Oct. 15, 1996

[51] Int. Cl.⁶ .................................................. H04Q 7/00
[52] U.S. Cl. ........................................ 455/31.3; 455/38.1
[58] Field of Search ................................. 455/31.1, 31.2, 455/31.3, 32.1, 38.1; 340/825.44; 370/312, 432, 465, 468, 471, 522

[56] References Cited

U.S. PATENT DOCUMENTS

| | | | |
|---|---|---|---|
| 5,423,057 | 6/1995 | Kuznicki et al. | 455/38.3 |
| 5,483,670 | 1/1996 | Childress et al. | 455/510 |
| 5,561,848 | 10/1996 | MInami | 340/825.44 |
| 5,598,148 | 1/1997 | Koechler | 455/38.1 |
| 5,603,088 | 2/1997 | Gorday et al. | 455/67.1 |
| 5,625,885 | 4/1997 | Nakzawa et al. | 455/38.1 |
| 5,644,568 | 7/1997 | Ayerst et al. | 370/311 |
| 5,644,626 | 7/1997 | Carlson et al. | 455/31.2 |
| 5,644,627 | 7/1997 | Segal et al. | 455/31.2 |
| 5,649,294 | 7/1997 | Ayerst et al. | 455/38.1 |
| 5,691,709 | 11/1997 | Guntin | 455/38.1 |
| 5,691,979 | 11/1997 | Cadd et al. | 370/312 |

*Primary Examiner*—Reinhard J. Eisenzopf
*Assistant Examiner*—Edan Orgad
*Attorney, Agent, or Firm*—R. Louis Breeden

[57] ABSTRACT

A selective call two-way communication system having a plurality of selective call transceiver units (170) using an inbound channel overlay on an outbound selective call system, the selective call transceiver units comprising a receiver (173) for receiving a message having an address directed to and decodable by the receiver wherein the address (58) points to a vector (60), a decoder (174) for decoding a pointer within the vector that points to a control information portion (66) within an outbound message portion (67) and for decoding another control information portion (64) for controlling inbound transmissions within an outbound message portion, and a transmitter (172) for transmitting information in accordance with the control information portions. The system further comprises a controller (114) for receiving, formatting and encoding messages having an address wherein the address points to a vector(s) which contains pointer(s) to control information portion(s) within an outbound message portion.

15 Claims, 5 Drawing Sheets

METHOD AND APPARATUS FOR OVERLAYING AN INBOUND CHANNEL ON AN OUTBOUND SYSTEM

FIELD OF THE INVENTION

This invention relates in general to an inbound channel overlay to an outbound system and more specifically to a inbound channel overlay to an outbound system by imbedding inbound control commands within the outbound messages.

BACKGROUND OF THE INVENTION

One-way paging systems and protocols such as Motorola's FLEX™ protocol and system are known for their flexibility in accommodating other one-way paging protocols within the FLEX™ protocol. To date, these protocols have not been known for two-way capability or upgradeability. The structure of known one-way paging protocols and their complexity make them appear as if to preclude mixing the use of one-way subscriber units with two-way subscriber units using the same protocol in the same system. The desire for two way paging is evident from the high prices paid by major communication companies for Personal Communications Services (PCS) frequencies at government auctions. Unfortunately, many of the less funded communication companies were left without spectrum to build out a two-way paging system. Additionally, even the auction winners will initially have problems filling their newly acquired frequencies to capacity with two-way subscriber users for a period of time and may want to utilize a one-way system on their two-way channels and eventually mix in two-way devices. Thus, a need exists for a inbound overlay to a one-way communication system that can provide a two-way communication solution for owners of one-way spectrum as well as a stop gap solution for under utilized two-way spectrum for owners of two-way PCS frequencies.

One-way paging service providers that use the FLEX™ protocol and do not own inbound spectrum for instance are interested in using spread spectrum technology for inbound paging over unlicensed bands such as the ISM band. The present invention offers a solution for overlaying an inbound paging system (spread spectrum or others) on top of FLEX™ or other protocols without causing any changes to the protocol for the one-way users. The invention opens the door to FLEX™ or other one-way protocols to enter the two-way market with minimum changes to their existing one-way system and with minimum investments in infrastructure.

SUMMARY OF THE INVENTION

In a first aspect of the present invention, a method for overlaying an inbound channel on an outbound selective call system for creating a two way selective call system comprises the steps at a controller of embedding a control information portion within an outbound message portion characterizing how the inbound channel should operate for a given selective call device. An address is provided for the given selective call device that directs the given selective call device to decode the control information portion within the outbound message portion.

In a second aspect of the present invention, a method for overlaying an inbound channel on an outbound selective call system for creating a two way selective call system comprises the subscriber steps of receiving a message having an address directed to and decodable by the subscriber, the address pointing to a vector, decoding a pointer within the vector that points to a control information portion within an outbound message portion and decoding a control information portion within an outbound message portion characterizing how an inbound channel should operate for the subscriber unit.

In another aspect of the present invention, a selective call transceiver unit comprises a receiver for receiving a message having an address directed to and decodable by the receiver, the address pointing to a vector, a decoder for decoding a pointer within the vector that points to a control information portion within an outbound message portion and for decoding a control information portion within an outbound message portion characterizing how an inbound channel should operate for the selective call transceiver unit, and a transmitter for transmitting information in accordance with the control information portion.

In yet another aspect of the present invention, a controller comprises an input device for receiving and formatting messages having an address for at least one of a plurality of selective call transceivers and an encoder for encoding the messages having the address for the at least one of the plurality of selective call transceivers that points to a vector which contains a pointer to a control information portion within an outbound message portion, the control information portion characterizing how an inbound channel should operate for a given selective call transceiver.

DETAILED DESCRIPTION

The present invention is primarily described using a spread spectrum inbound channel as an overlay to an existing FLEX™ one-way outbound channel. One ordinarily skilled in the art should note that the present invention is not necessarily limited to these protocols, but would have application to other one-way and two-way messaging applications. Ideally, the present invention provides an inbound channel overlay to an outbound paging channel such as a one way FLEX™ system without any protocol modifications to the one-way outbound protocol. The overlay is preferably independent of the outbound protocol.

Figure 1:
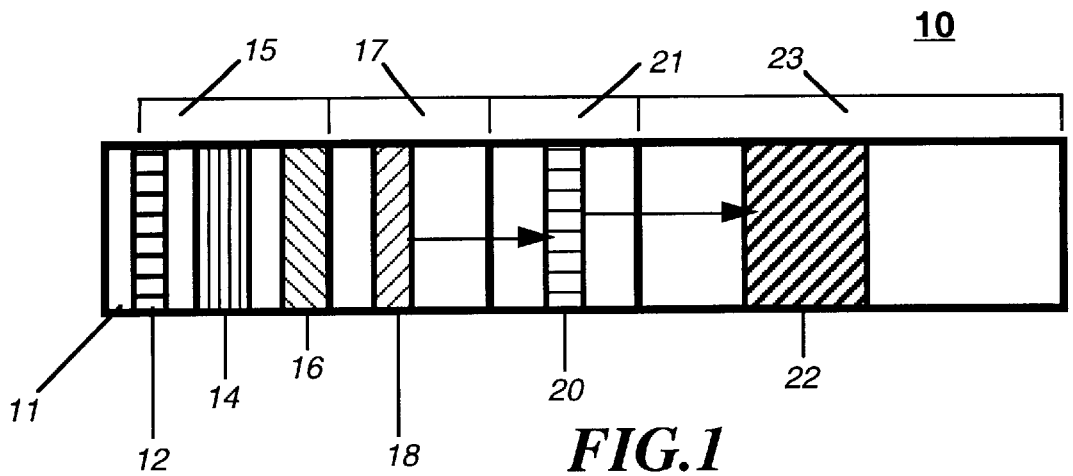
FIG. 1 illustrates a frame structure for a two-way paging system.

In a ReFLEX™ system by Motorola, Inc., Personal Messaging Units (PMUs) are instructed on how to access the inbound channel through BIWs (Block Information Words) and vectors. BIWs as well as vectors are typically used to address and command the PMUs. They are separate and apart from the portion of the frame which contains the message. Referring to FIG. 1, a ReFLEX™ frame structure 10 is shown having a synchronization portion 11, a block information field (BIF) 15 preferably containing a frame information word 12, a Block information word (BIW) 14, and a cyclic redundancy check (CRC) 16 within the BIF 15. The CRC 16 is used for bit error detection in the received BIW. An address field 18 within an address portion 17 follows the CRC 16 and provides address information to a selective call receiver on a control channel. The address field points to a corresponding vector 20 within a vector portion 21. The vector generally contains control information for a subscriber unit regarding the location of a forward channel message in a frame. For instance, vector 20 may contain a pointer that points to a message in the message field 22 within an outbound message portion 23. In the ReFLEX™ protocol, the vector 20 may also contain reverse channel scheduling information regarding the subscriber unit's transmission of an acknowledgment response or may also contain scheduling and control information for a subscriber unit initiating a transmission on the reverse (or inbound) channel. In any event, the vector and address fields in existing systems are grouped together and kept apart from the message portion 23.

The FLEX™ protocol was originally designed to operate in a one-way mode. The frame structure did not appear flexible enough to allow the addition of new BIWs or vectors. A different way of communicating the system configuration parameters to subscriber units or personal message units (or PMUs) was needed. Specifically, the present invention describes how the control information and/or commands/instructions (BIWs and Vectors) for the inbound channel can be embedded within forward message field. The system delivers the embedded control information as if the information was a regular outbound message and one-way PMUs ignore these 2-way instructions while the two-way PMUs interpret them as two-way BIWs or two-way vectors (preferably as if it were in the ReFLEX™ environment).

Figure 2:
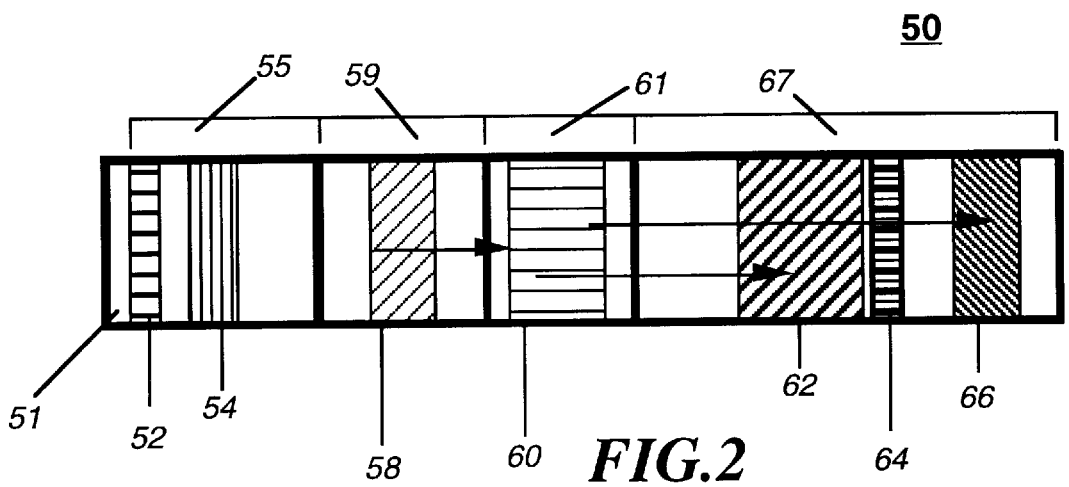
FIG. 2 illustrates a frame structure for a two-way overlay to a one-way paging system in accordance with the present invention.

Referring to FIG. 2, there is shown a FLEX™ frame structure 50 (including a synchronization portion 51) accommodated for two-way communication in accordance with the present invention. As in the frame structure of FIG. 1, the frame structure 50 also preferably includes a frame information word 52 and a Block information word (BIW) 54 all within a block information field (BIF) 55. The frame structure 50 further comprises an address field 58 within the address portion 59 that either points to or correlates with a vector field 60 within a vector portion 61. It should also be understood within the context of the present invention, that "pointing to" a particular location could also mean that an address or vector could correlate or be used to calculate another location that is being "pointed to" by the address or vector. The vector field 60 may contain a pointer that points to a message field 62 within an outbound message portion 67 and other pointers that point to a two-way Block information word 66 (TWBIW) specifically directed to two-way pagers. The frame structure 50 also preferably includes a vector 64 preferably appended to the forward message field 62 that may contain information controlling how the subscriber unit should reply on the inbound channel. The vector 64 can also reside at the beginning of the message field 62 or somewhere in between, but the vector 64 is preferably appended to the end of the message field 62 as shown. In the broadest aspect of the invention, the address can merely point to or correlate with an outbound message field having control information within the outbound message field without the use of vectors as described above.

Figure 3:
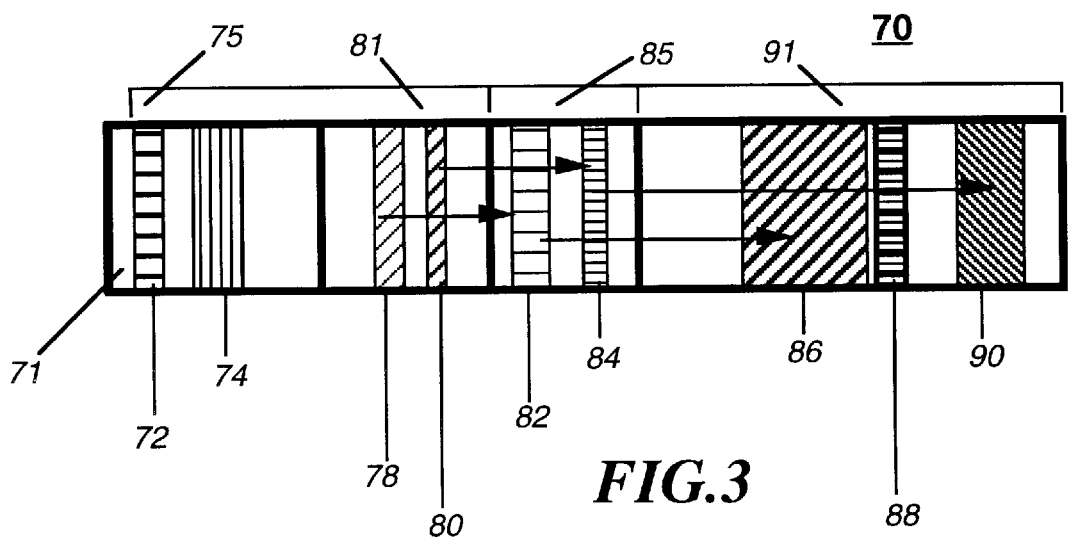
FIG. 3 illustrates another frame structure for a two-way overlay to a one-way paging system in accordance with the present invention.

In the example above as well as the following example, one can define one-way BIWs (OWBIWs) as the set of all BIWs currently used in the FLEX™ protocol and located early in the frame. The 2-way BIWs (TWBIWs) can be defined as the set of all new BIWs that are communicated to 2-way units in the message portion of the frame. In the next example making reference to FIG. 3, there is shown another frame structure 70 having a synchronization portion 71 and a block information field 75 containing a frame information word 72, and a OWBIW 74. The frame structure 70 further preferably comprises a personal address field 78 that either correlates with a vector field 82 or contains pointers to a vector field 82 corresponding to the personal addresses in the personal address field 78 as well as a global address field 80 containing pointers to a vector field 84 corresponding to the global addresses in the global address field 80. The vector field 82 preferably contains pointers pointing to a regular outbound message field 86 while the vector field 84 contains pointers to another outbound message 90 containing the TWBIWs. As in frame structure 50, frame structure 70 also preferably includes a vector 88 appended to the forward message field 86 that may contain information controlling how the subscriber unit should reply on the inbound channel and/or how and when the subscriber can initiate an inbound message. The address fields 78 and 80 are within an address portion 81, the vector fields 82 and 84 are within a vector portion 85 and the message field 86, the outbound message 90 and the vector 88 are all within an outbound message portion 91.

Generally, two-way units are preferably characterized by their unique personal address as well as a global address. Preferably, the personal address is used for personal message delivery while the global address is used for system configuration. If a PMU decodes either one of the addresses, it preferably decodes the corresponding vector as well as the corresponding forward message. A two-way PMU will preferably be programmed to decode the global address and corresponding vectors while a one-way unit will ignore the global address information if such information is ever sent to a one-way PMU. Additionally, a system controller will likely know not to send such extraneous information to one-way PMUs.

Periodically, the system can send a special forward message to 2-way units, using the global address. This message is used to inform 2-way units about system configuration. Since the message is sent on the global address, the PMU that is properly programmed knows that it is a (TWBIW) and makes the appropriate interpretation. A TWBIW can preferably include information about modulation schemes (4 Level FSK, Spread Spectrum, QAM, FLEX, POCSAG, etc.), a boundary between scheduled and unscheduled slotted (ALOHA) transmissions, the maximum number of ALOHA retries allowed by the subscriber unit, the reverse (or inbound) channel speeds, the randomization interval for ALOHA transmissions, the ALOHA time out period, power levels, and many other communication parameters including but not limited to spread spectrum parameters such as hopping sequences, spreading gain or hopping frequencies.

Vectors contain control information and are used to command, instruct, and respond to subscriber units. Preferably, there is a one-to-one mapping between vectors and personal addresses. When a subscriber unit (one-way or two-way) decodes its personal address in the address field portion of the frame, it computes the start word or reads a vector pointer which indicates the start word of the associated vector within the vector portion. The subscriber unit must read the vector in order to locate its forward message.

Both one-way and two-way units are allowed to coexist on the same system. One-way units receive only "traditional" forward messages. Their vectors are located in the vector portion of the frame. Two-way units preferably have two different kinds of vectors (although a two-way unit can operate with just one kind of vector within contemplation of the present invention). One way vectors (OWVectors) are located at the vector portion of the frame and two-way vectors (TWVectors) (64 and 88 in FIGS. 2 and 3 respectively) are preferably appended to forward messages. OWVectors are the ones currently used by the FLEX™ protocol. TWVectors are used to instruct two-way pagers on how to respond to forward messages or how to initiate inbound messages. The TWVectors could just as easily provide much of the information found in the TWBIW described above and contemplated by the present invention. A system controller in such a system would thus append messages to 2-way FLEX transmissions but not to one-way FLEX transmissions. Vectors would be appended to the message portions only to messages which are sent to 2-way units. Preferably, the two-way system is configured through a global address as described in FIG. 3. Thus, one way units would not decode global addresses nor receive appended vectors.

Figure 4:
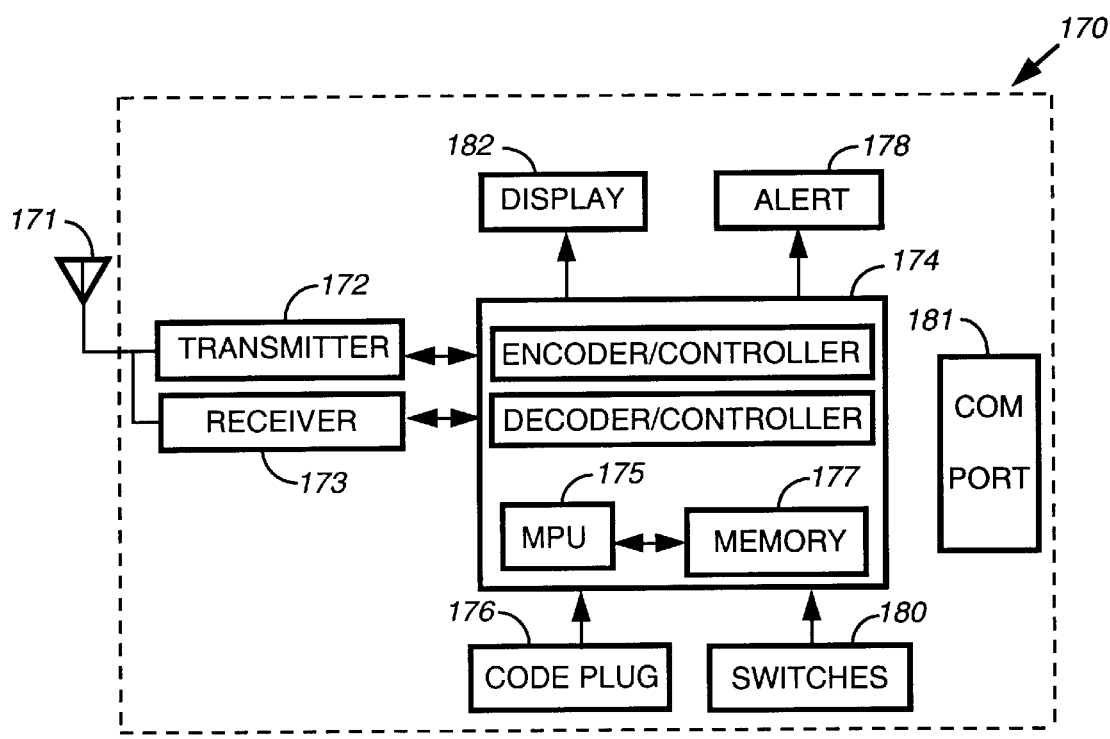
FIG. 4 is a block diagram for a selective call transceiver unit in accordance with the present invention.

Referring to FIG. 4, the selective call transceiver 170 which can operate as one-way selective call receiver in a one-way coverage zone or as selective call transceiver in a two-way coverage zone is shown. Preferably the transceiver 170 comprises a selective call receiver 173 coupled to a decoder and a controller 174 and a selective call transmitter 172 coupled to the controller and an encoder 174. The transceiver 170 preferably further comprises a memory 177 and a code plug 176 coupled to the controller 174. The selective call transceiver can further comprise a display 182 such a liquid crystal display or a tactile or audible alert 178 such as a transducer or vibrator motor.

The selective call transceiver 170 includes an antenna 171 for intercepting transmitted RF signals and for transmitting RF signals via a transmitter 172. The antenna 171 couples a received signal to the receiver 173, the receiver 173 and the transmitter 172 forming a transceiver. The transceiver produces a data stream representative of a demodulated received signal coupled to a decoder/controller 174. The transceiver (172, 173) is also responsive to a modulation input such as data received from the decoder/controller 174 to frequency modulate a carrier signal for transmission out from the device 170. As is well known in the art, the decoder/ controller 174 may include a central processing unit such as a microprocessor 175 or the like for processing demodulated signal information in accordance with the software stored in a memory 177 of the decoder/controller 174. The decoder/ controller 174 is also responsive to inputs from one or more switches 180 or other input devices to generate data that is coupled to the transceiver (172, 173) for transmission out from the device 170. The RF signals transmitted by the transmitter units of a paging system typically include control information containing an address that identifies a particular device 170. In a typical one-way system, page message information follows the control information. The decoder/controller 174 decodes a received address by comparing it with one or more addresses stored in a code plug or code memory 176. If the decoder/controller 174 detects a match between a received address and a stored address, an alert signal may be generated by a device 178 so as to alert a user that a message has been received by the device 170. The alert signal may be an audible and/or tactile alert such as a silent vibrating alert. It is noted that if the RF signals only contain control information and no user viewable message, an alert need not be generated upon an address match. The switches 180 may be actuated by a user to select between the types of alerts as well as for inputting information to the memory 177 and causing a message stored in the memory of the decoder/controller 174 to be accessed for display on a display 182. The switches 180 may also provide additional functions such as reset, read, delete, etc. as is known or generate two-way functions or responses messages. The device 170 may also include a conventional communication port 81 for hardwire connection to a wired subsystem as well.

The selective call transceiver unit 170 uses an inbound channel overlay on an outbound selective call system for creating a two way selective call system. The selective call transceiver unit 170 preferably comprises a receiver 173 as described above for preferably receiving a message having an address directed to and decodable by the receiver, the address pointing to a vector and a decoder for decoding a pointer within the vector that points to a control information portion within an outbound message portion and for decoding a control information portion within an outbound message portion characterizing how an inbound channel should operate for the selective call transceiver unit. The unit 170 further comprises a transmitter 172 for transmitting information in accordance with the control information portion. The control information portion further comprises a two-way Block Information Word, wherein the two-way Block Information Word (TWBIW) preferably comprises information selected from the group of boundary information between scheduled and unscheduled slotted transmissions, the maximum number of unscheduled slotted retries allowed by the selective call transceiver unit, the reverse channel speeds, the randomization interval for unscheduled slotted transmissions, the unscheduled slotted transmission time out period, and including but not limited to the many other communication parameters previously mentioned above (modulation, retries, spreading gain, etc.). The control information portion can further comprise information on spread spectrum parameters selected from the group of the hopping frequency and the sequence of the hops if desired. The control information portion can further comprise two-way vectors (TWVectors) for instructing the selective call transceiver how to respond to forward messages or how to initiate inbound messages. If desired, the TWBIW and TWVectors can interchangeably control operations normally reserved for the other as contemplated in the present invention.

Figure 5:
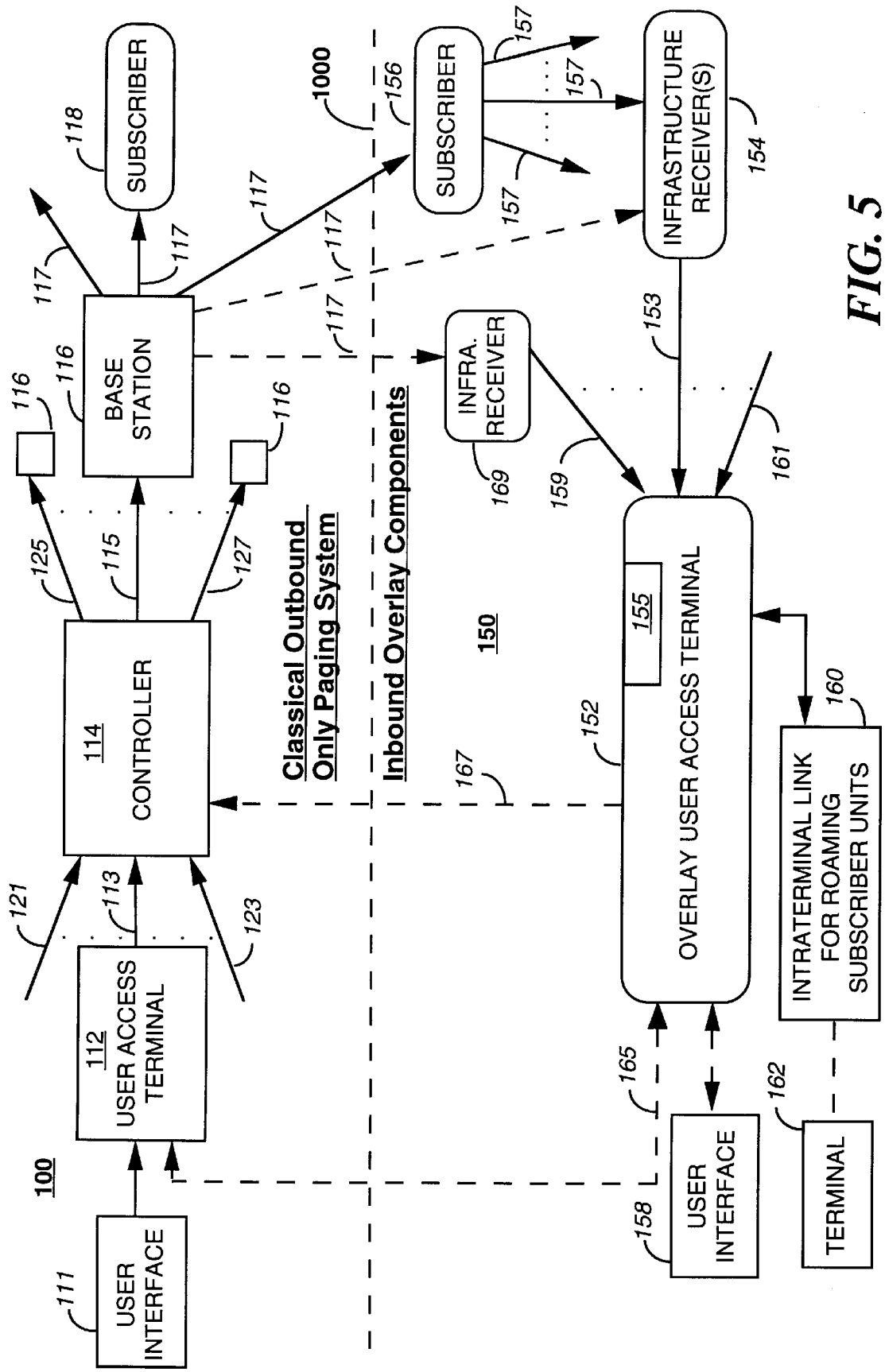
FIG. 5 is a block diagram of a two-way messaging system using an inbound overlay paging system in accordance with the present invention.

Referring to FIG. 5, a block diagram for the overlay system is shown in accordance with the present invention. The elements above the demarcation line 1000 can be found in an existing outbound only paging system 100. The elements below the line 1000 belong to the inbound overlay system 150. The outbound only paging system typically comprises a user interface 111 which can simply be a conventional phone or preferably an alphanumeric entry device such as Motorola's Alphamate® alpha entry device or a computer having software allowing for a modem or an internet connection to a paging terminal such as the user access terminal 112. Messages and data received at the user access terminal 112 are preferably forwarded via link 113 and encoded, queued and batched at a controller 114. Alternatively, these functions or portions of these functions can be done in separate units or within a paging terminal such as the user access terminal 112. Additionally, the controller can receive data or messages from other sources (121 and 123). Once the functions of queuing and batching are done, the messages can be forwarded to one or more base station transmitters (116) over a plurality of links (115, 125 and/or 127). The base station transmitter 116 can then transmit a selective call message over an RF outbound path 117 to a plurality of subscriber units (118 and 156). The subscriber unit 118 can be a typical one way unit and the subscriber unit 156 is preferably a two way unit.

The subscriber unit 156 preferably has receive and transmit capabilities and preferably its operation will differ from existing two way systems in what it expects to receive from the one way only infrastructure, and the different means for delivering two way control data. In other words, the formatting, location, and vehicles used to route control data found in an existing one-way outbound system could be changed so that the overlay system is accommodated without affecting the existing one-way system. For instance, control data typically only found in a header can be imbedded in the message portion of an outbound paging transmission. In any event, the subscriber unit 156 preferably uses an RF inbound link 157 to transmit to an infrastructure receiver 154 or a plurality of infrastructure receivers (not shown). The subscriber unit 156 can use a variety of modulation techniques for transmitting its inbound signals (i.e., acknowledgment signals, canned responses) including spread spectrum techniques. This receiver 154 may be the same as those used in non-overlay two way messaging systems and should be able to decode the modulation technique used by the subscriber unit, but they need not be aware of whether this is an overlay or a complete two way system. The Infrastructure receiver 154 is preferably linked to an overlay user access terminal 152 which will provide reconciliation of inbound and outbound messages among other things. Optionally, the infrastructure receiver 154 could have two receivers within the same unit to decode both the inbound messages from the subscriber unit as well as the outbound messages coming from one-way outbound paging system 100. Alternatively or in addition to the infrastructure receiver 154, a separate infrastructure receiver 169 could be used as a monitor receiver for directly receiving and decoding outbound messages to further add to the integrity of the inbound overlay system. Thus, inbound messages from the subscriber unit 156 will be correctly correlated with the outbound messages from the paging system 100. The infrastructure receivers that directly receive and decode the outbound messages from the paging system 100 are particularly useful in cases where the messages did not originate from the overlay user access terminal 152 or the inbound overlay system, but from the user interface 111 for instance.

Another option than could eliminate the costs of additional user interfaces and associated phone lines comprises the coding and re-routing of messages designated for the two-way system. For instance, a message that is designated for a known two-way subscriber unit that is initiated through the user interface 111 of the one-way outbound paging system, could be redirected at the user access terminal 112 to be sent to the overlay user access terminal 152 via link 165. This would allow the overlay user access terminal to act as if the message was initiated at the user interface 158 without requiring the user interface 158. Then, the message could be sent back through link 165 to the user access terminal 112 with the subscriber identification modified such that it is recognized as an outbound only subscriber unit, or the message could be sent directly to the controller 114 from the overlay user access terminal 152 via link 167. Again, the controller 114 in this instance should view and handle the information from the overlay user access terminal 152 as if the message was initiated from the user access terminal 112 and intended for a typical one-way subscriber unit.

Callers accessing two way devices such as subscriber unit 156 can reach the overlay user access terminal 152 via a plurality of RF inbound links (153, 159, 161). Alternatively, like the one way user access terminal 112, another user interface 158 such as a computer with alpha entry paging software can be linked to the overlay user access terminal 152. The user interface 158 could be used among other things to modify subscriber lists, modify class of service for a particular subscriber, or initiate a page through the overlay user access terminal 152. Initiating an outbound page through the overlay user access terminal 152 would require either a link 165 to the one way user access terminal 112 or a link 167 to the controller 114 of the outbound paging system. The link used would depend on the configuration of the service provider's system. The overlay user access terminal 152 is cognizant of the two way operations and would have access to a data base in memory 155 (or elsewhere) necessary to properly signal the subscriber units. Signals received from the subscriber units are processed and acted on accordingly.

Additionally, a two-way system, including this overlay system can allow for roaming of subscriber units among different paging systems. Thus, an intraterminal link 160 coupled to the overlay user access terminal 152 as well as to a remote terminal 162 from another system would facilitate the forwarding of messages and location finding of roaming subscriber units. The remote terminal 162 can also be another overlay user access terminal like terminal 152.

The means for interconnecting the various blocks are numerous. In general they will be driven by the service provider's existing data networks, the availability within the regions of service, and the costs of the available means. Co-location of the parts, although often a cost advantage, is not necessary to the effective operation as long as the latencies are not severe and the bandwidth adequate for existing traffic.

The present invention allows to a varying degree for several full two-way features using inbound control via the outbound infrastructure. For instance, frequency reuse is a feature that creates the ability to locate a subscriber unit to a sufficiently restricted area so a limited number of transmitters can be used for further delivery of data. Other subscriber units which are sufficiently separated from the unit can then also use the same communication resource (same frequency or time slot, etc.) without there being harmful interference at each subscriber unit location.

As a unit moves to different regions it searches for regional identification codes. These could exist in the normal protocols, or be generated as periodic global pages by the overlay terminal. When a two-way unit detects it has entered a different region, it can transmit an unsolicited message. The system receiving this message informs the home system of the unit as to its whereabouts. The home system will now only send pages to the registration area. If the page is not acknowledged in the registration area and if the customers options are set appropriately, the system may hunt for the unit in other regions, having assumed that registration failed for some reason.

A two-way system facilitates the delivery of subscriber originated information or replies to outbound requests. The delivery of responses, delivery confirmation or failure, or read indication can be delivered by outdialing, holding the information for caller inquire, forwarding to another pager, or a variety of other means.

The inbound overlay system essentially uses a subscriber unit (156) and infrastructure adjunct (152 & 154) to exploit the existence of outbound only paging systems without them being aware or modified. In this way, additional paging traffic is generated to an existing outbound only paging system to, among other things, retransmit an undelivered page, or locate a subscriber unit's position, or retransmit uncorrupted or unacceptable data previously sent, or manage the inbound traffic in a more efficient manner than present art allows. Additionally, the overlay system allows for input and return of two way traffic via the overlay portion of the system.

A system in accordance with the present invention will preferably have a controller having an input device for receiving and formatting messages having an address directed for at least one of a plurality of selective call transceivers. The controller preferably also comprises an encoder for encoding the messages as well as the address for the at least one of the plurality of selective call transceivers. The address preferably points to a vector which contains a pointer to a control information portion within an outbound message portion, the control information portion characterizing how an inbound channel should operate for a given selective call transceiver. The controller can further comprise a decoder for decoding inbound messages from the selective call transceivers. The controller can further comprise a scheduler for scheduling outbound messages from a base station transmitter and for scheduling inbound messages from the plurality of selective call transceivers. Referring to FIG. 5, the "controller" functions and elements described above can either reside in the controller 114 or in the overlay user access terminal 152 or in other configurations that would be within the scope of this invention.

Figure 6:
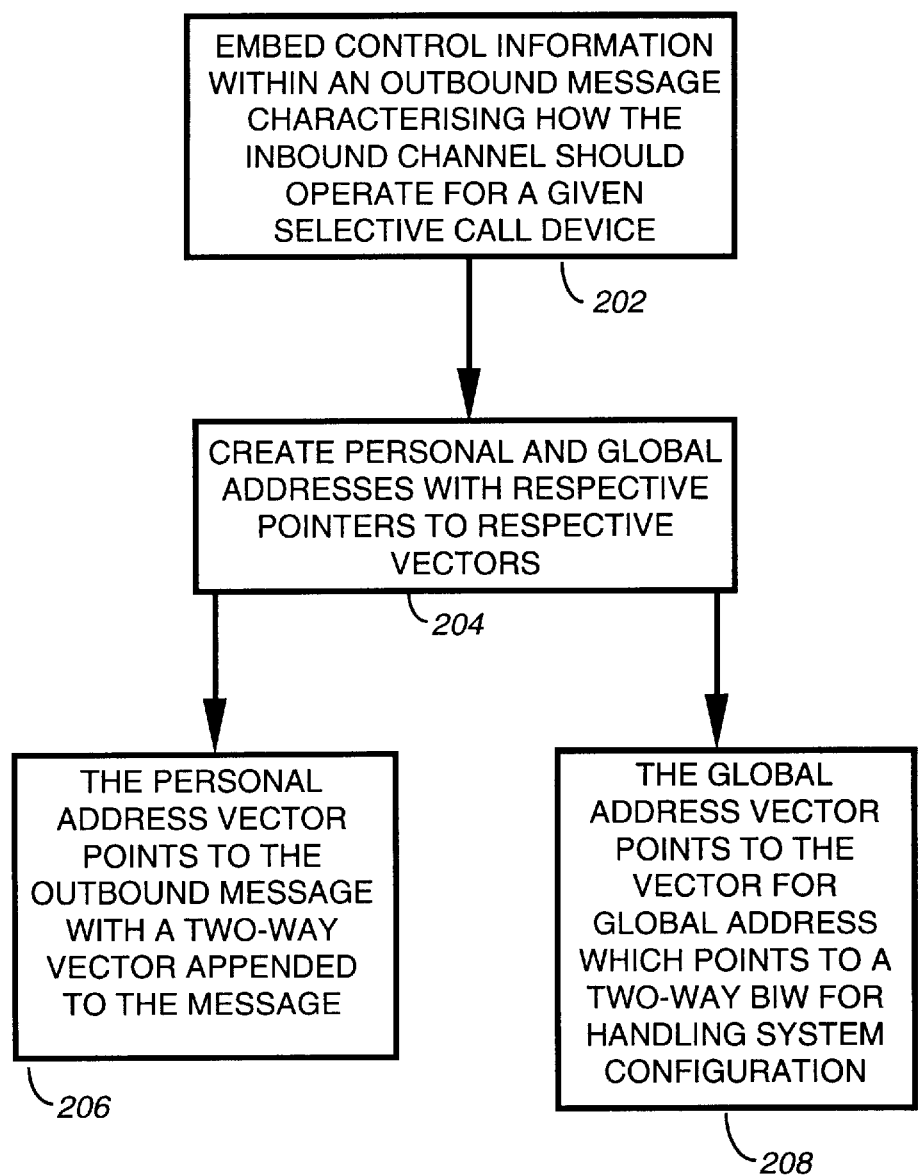
FIG. 6 is a flow chart describing a method at a controller in accordance with the present invention.

Referring to FIG. 6, a method 200 for overlaying an inbound channel on an outbound selective call system for creating a two way selective call system is shown. The method preferably comprises the steps at a controller of embedding a control information portion within an outbound message portion characterizing how the inbound channel should operate for a given selective call device at step 202. The method preferably provides an address or addresses for the given selective call device that points to a vector or vectors at step 204. At step 206, the personal address vector points to an outbound message that will further preferably include a two-way vector (TWVector) within or appended to the outbound message. This two-way vector preferably contains control information that will define how communication on the overlayed inbound channel will operate. For example, such operative characteristics could include modulation schemes, bit rates, slot assignments, coding schemes, repetitions or retries, or spreading gain to name a few. At step 208, the system configuration is preferably handled by using the global address which points to a vector which in turn points to the control information. As previously described, the control information can come in the form of a two-way BIW (TWBIW). Again, the vectors for the personal address point to the outbound message portion having a two-way vector that generally controls message delivery whereas the vectors for the global address point to the control information portion and preferably sets system configurations. In either case, vector point to control information for the inbound channel within the outbound message portion. As previously noted, it is contemplated within the spirit and scope of the present invention that message delivery options and system configurations could easily be derived from message portions that were vectored from either global or personal addresses.

Figure 7:
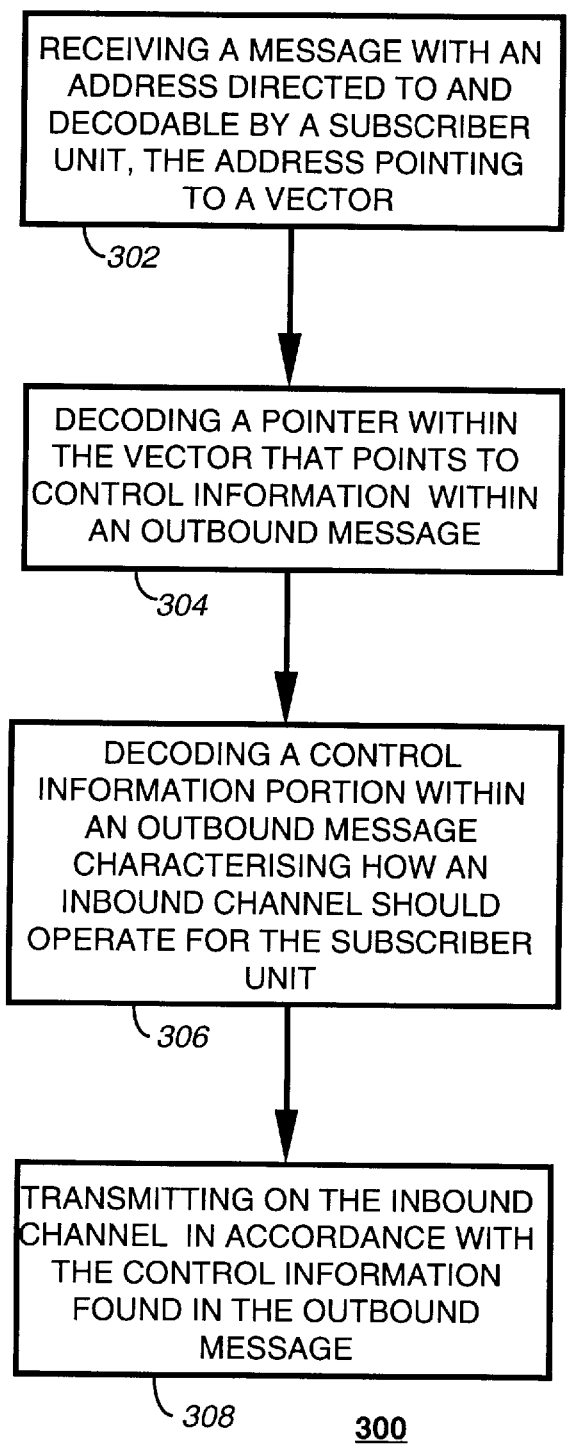
FIG. 7 is a flow chart describing a method at a subscriber unit in accordance with the present invention.

Referring to FIG. 7, a method 300 at a subscriber unit for overlaying an inbound channel on an outbound selective call system for creating a two way selective call system comprises the steps of receiving a message having an address directed to and decodable by the subscriber, the address pointing to a vector at step 302. Then, at step 304, the subscriber unit decodes a pointer within the vector that points to a control information portion within an outbound message portion. At step 306, the subscriber unit decodes a control information portion within an outbound message portion characterizing how an inbound channel should operate for the subscriber unit. As described before, the address section may comprise a personal address and a global address correspondingly having pointers to vectors for the personal addresses and to vectors for the global addresses. The vectors for the personal address preferably point to the usual one-way outbound message portion, but the outbound message portion meant for two-way subscriber devices will preferably contain a two-way vector (TWVector) that can instruct a subscriber unit or selective call transceiver how to respond on an inbound channel. Meanwhile, the vectors for the global addresses can point to a separate control information portion in the outbound message portion. The separate control information portion preferably contains two-way BIWs (TWBIWs) that can preferably define system configurations for the inbound channels as previously described. Finally, at step 306, the method further comprises the step of transmitting on the inbound channel in accordance with the control information portion. Again, the control parameters within the TWBIWs and TwVectors can be interchangeable, mixed or combined as needed.

It should be understood that the disclosed embodiments are merely examples and the invention is not restricted thereto. It should be further understood by those skilled in the art that variations and modifications can be made without deviating from the scope and spirit of the present invention defined by the appended claims.

What is claimed is:

1. A method for overlaying an inbound channel on an outbound selective call system for creating a two way selective call system, comprising at a controller the steps of:

embedding a control information portion within an outbound message portion characterizing how the inbound channel should operate for a given selective call device, wherein the control information portion comprises a two-way Block Information Word, wherein the two way Block Information Word comprises information selected from a group of modulation schemes, coding schemes, power levels, boundary information between scheduled and unscheduled slotted transmissions, a maximum number of unscheduled slotted retries allowed by the selective call transceiver unit, reverse channel speeds, a randomization interval for unscheduled slotted transmissions, an unscheduled slotted transmission time out period, and slot assignments; providing an address for the given selective call device that points to a vector; and providing a pointer within the vector that points to the control information portion within the outbound message portion.

2. The method of claim 1, wherein the step of providing an address comprises the step of providing a personal address and a global address.

3. The method of claim 1, wherein the step of providing an address comprises the step of providing a personal address and a global address correspondingly having pointers to a vector for the personal address and to a vector for the global address.

4. The method of claim 3, wherein the vector for the personal address points to the outbound message portion that contains the control information portion.

5. The method of claim 3, wherein the vector for the global address points to the control information portion.

6. A method for overlaying an inbound channel on an outbound selective call system for creating a two way selective call system, comprising at a subscriber unit the steps of:

receiving a message having an address directed to and decodable by the subscriber unit, the address pointing to a vector;

decoding a pointer within the vector that points to a control information portion within an outbound message portion, wherein the control information portion comprises a two-way Block Information Word, wherein the two way Block Information Word comprises information selected from a group of modulation schemes, coding schemes, power levels, boundary information between scheduled and unscheduled slotted transmissions, a maximum number of unscheduled slotted retries allowed by the selective call transceiver unit, reverse channel speeds, a randomization interval for unscheduled slotted transmissions, an unscheduled slotted transmission time out period, and slot assignments, and decoding the control information portion within the outbound message portion to determine how the inbound channel should operate for the subscriber unit.

7. The method of claim 6, wherein the step of receiving a message further comprises the step of receiving a personal address and a global address.

8. The method of claim 6, wherein the step of receiving a message further comprises the step of receiving a personal address and a global address correspondingly having pointers to a vector for the personal address and to a vector for the global address.

9. The method of claim 8, wherein the vector for the personal address points to the outbound message portion.

10. The method of claim 8, wherein the vector for the global address points to the two-way Block Information Word.

11. The method of claim 6, wherein the method further comprises the step of transmitting on the inbound channel in accordance with the control information portion.

12. A selective call transceiver unit using an inbound channel overlay on an outbound selective call system for creating a two-way selective call system, the selective call transceiver unit comprising:

a receiver for receiving a message having an address directed to an decodable by the receiver, the address pointing to a vector;

a decoder for decoding a pointer within the vector that points to a control information portion within an outbound message portion and for decoding the control information portion within the outbound message portion to determine how an inbound channel should operate for the selective call transceiver unit, wherein the control information portion comprises a two-way Block Information Word, wherein the two way Block Information Word comprises information selected from a group of modulation schemes, coding schemes, power levels, boundary information between scheduled and unscheduled slotted transmissions, a maximum number of unscheduled slotted retries allowed by the selective call transceiver unit, reverse channel speeds, a randomization interval for unscheduled slotted transmissions, an unscheduled slotted transmission time out period, and slot assignment; and a transmitter for transmitting information in accordance with the control information portion.

13. The selective call transceiver unit of claim 12, wherein the control information portion further comprises information on spread spectrum parameters selected from a group of a hopping frequency, a spreading gain, and a sequence of hops.

14. The selective call transceiver unit of claim 12, wherein the control information portion further comprises a two-way vector for instructing the selective call transceiver unit how to respond to forward messages or how to initiate inbound messages.

15. The selective call transceiver unit of claim 12, wherein the outbound selective call system uses FLEX modulation.

* * * * *